(12) United States Patent
Deferme

(10) Patent No.: US 8,997,953 B2
(45) Date of Patent: Apr. 7, 2015

(54) SHOCK ABSORBER HAVING A FULL DISPLACEMENT VALVE ASSEMBLY

(75) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 2350 days.

(21) Appl. No.: 11/897,351

(22) Filed: Aug. 30, 2007

(65) Prior Publication Data

US 2009/0057080 A1    Mar. 5, 2009

(51) Int. Cl.
*F16F 9/34* (2006.01)
*F16F 9/348* (2006.01)

(52) U.S. Cl.
CPC .................................. *F16F 9/3488* (2013.01)

(58) Field of Classification Search
USPC .......... 188/322.13, 322.15, 322.22, 313, 316, 188/317, 320
See application file for complete search history.

(56) References Cited

U.S. PATENT DOCUMENTS

| | | | |
|---|---|---|---|
| 4,993,524 A * | 2/1991 | Grundei et al. ............ | 188/282.6 |
| 5,123,671 A | 6/1992 | Driessen et al. | |
| 5,234,085 A | 8/1993 | Schneider | |
| 5,242,038 A | 9/1993 | Yamaoka | |
| 6,085,877 A | 7/2000 | Robinson et al. | |
| 6,089,142 A | 7/2000 | Adrian et al. | |
| 6,264,015 B1 | 7/2001 | De Kock | |
| 6,371,264 B1 | 4/2002 | Deferme | |
| 6,460,664 B1 | 10/2002 | Steed et al. | |
| 6,634,379 B2 | 10/2003 | Asadi et al. | |
| 6,899,207 B2 | 5/2005 | Deferme et al. | |
| 7,070,029 B2 | 7/2006 | Deferme | |
| 2001/0009214 A1 | 7/2001 | Tanaka | |
| 2006/0283676 A1 | 12/2006 | Deferme | |

FOREIGN PATENT DOCUMENTS

| | | |
|---|---|---|
| JP | 6-185562 | 7/1994 |
| JP | 07-238976 A * | 9/1995 |
| JP | 10-103512 A * | 4/1998 |
| KR | 10-2005-0064515 | 6/2005 |

OTHER PUBLICATIONS

Search Report dated Apr. 13, 2009 from corresponding PCT Application No. PCT/US2008/010252.

* cited by examiner

*Primary Examiner* — Robert A Siconolfi
*Assistant Examiner* — Vu Q Nguyen
(74) *Attorney, Agent, or Firm* — Harness, Dickey & Pierce, P.L.C.

(57) ABSTRACT

A shock absorber includes a piston assembly disposed within a pressure tube. The piston assembly has a first and a second housing and a valve assembly located adjacent the first housing. The valve assembly has a valve disc which engages the first housing to close at least one of a first plurality of passages extending through the first and second housings and a biasing member for applying a load to the valve disc.

10 Claims, 8 Drawing Sheets

SHOCK ABSORBER HAVING A FULL DISPLACEMENT VALVE ASSEMBLY

FIELD

The present disclosure relates generally to hydraulic dampers or shock absorbers for use in a suspension system such as a suspension system used for automotive vehicles. More particularly, the present disclosure relates to a shock absorber having a full displacement valve assembly to control fluid flow.

BACKGROUND

The statements in this section merely provide background information related to the present disclosure and may not constitute prior art.

Shock absorbers are used in conjunction with automotive suspension systems to absorb unwanted vibrations which occur during driving. Shock absorbers are generally connected between the sprung portion (body) and the unsprung portion (wheels) of the automobile. In a monotube shock absorber, a piston is located within a working chamber defined by a pressure tube of the shock absorber, with the piston being connected to the sprung portion of the automobile through a piston rod. The pressure tube is connected to the unsprung portion of the vehicle by one of the methods known in the art. Because the piston is able, through valving, to limit the flow of damping fluid between opposite sides of the piston when the shock absorber is compressed or extended, the shock absorber is able to produce a damping force which damps the unwanted vibration which would otherwise be transmitted between the unsprung portion and the sprung portion of the automobile.

In a dual tube shock absorber, a piston is located within a working chamber defined by a pressure tube of the shock absorber, with the piston being connected to the sprung portion of the automobile through a piston rod. A reserve tube surrounds the pressure tube to define a reserve chamber with a base valve assembly being located between the working chamber and the reserve chamber. The reserve tube is connected to the unsprung portion of the vehicle by one of the methods known in the art. Valving in the piston limits the flow of damping fluid between an upper side and a lower side of the piston when the shock absorber is extended to create a damping load. Valving in the base valve assembly limits the flow of damping fluid between the working chamber and the reserve chamber when the shock absorber is compressed to create a damping load. The piston also includes a check valve for replenishment of fluid on the upper side of the piston during a compression stroke and the base valve assembly includes a check valve for replenishment of fluid on the lower side of the piston during an extension stroke.

SUMMARY

A shock absorber piston typically has at least one fluid control valve assembly. The fluid control valve assembly includes a valve disc which moves axially with respect to the piston body to fully open the fluid passage. The fluid control assembly can be used as a compression valve assembly and/or as a rebound valve assembly for either the piston assembly and/or a base valve assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
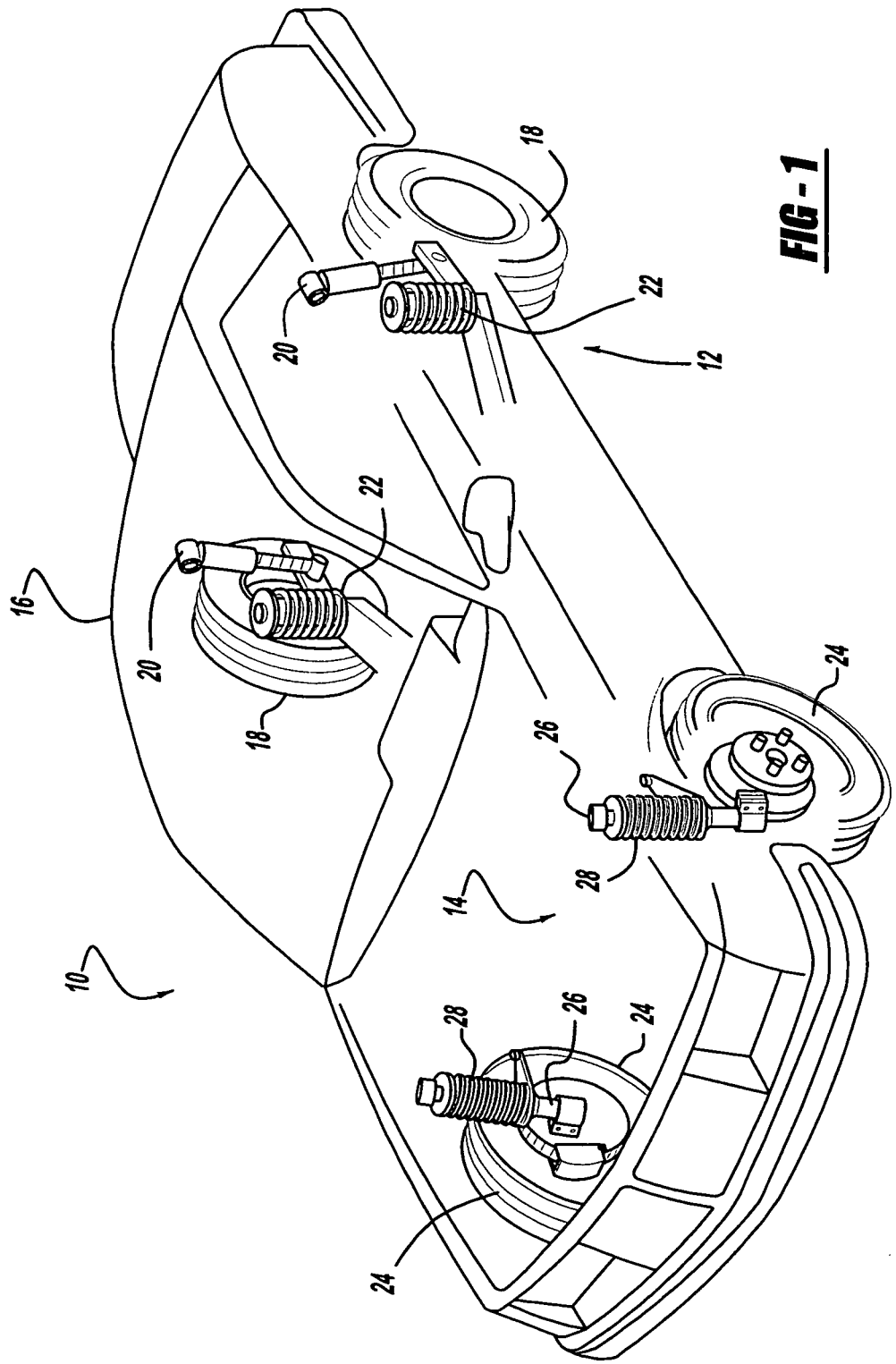
FIG. 1 is an illustration of an automobile having shock absorbers which incorporate the piston design in accordance with the present invention.

The following description is merely exemplary in nature and is not intended to limit the present disclosure, application, or uses. There is shown in FIG. 1 a vehicle incorporating a suspension system having shock absorbers, each of which incorporates a piston assembly in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
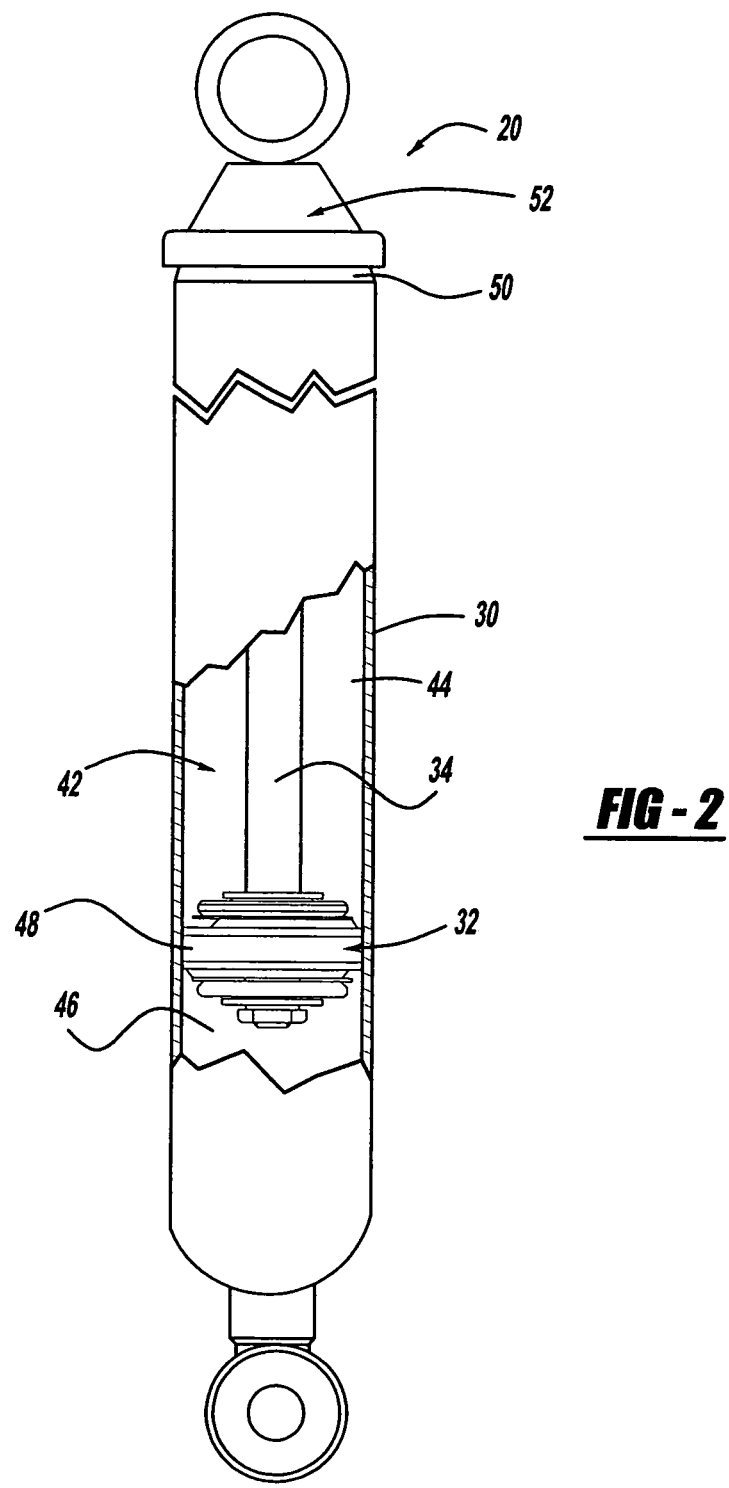
FIG. 2 is a side view, partially in cross-section of a shock absorber from FIG. 1 which incorporates the piston design in accordance with the present invention.

Referring now to FIG. 2, shock absorber 20 is illustrated in greater detail. While FIG. 2 illustrates only shock absorber 20, it is to be understood that shock absorber 26 also includes the multi-piece piston in accordance with the present invention. Shock absorber 26 only differs from shock absorber 20 in the way it is adapted to be connected to the sprung and unsprung portions of vehicle 10. Shock absorber 20 comprises a pressure tube 30, a piston assembly 32 and a piston rod 34. While shock absorber 20 with piston assembly 32 is illustrated as a mono-tube shock absorber, piston assembly 32 can also be utilized in a dual-tube or multi-tube shock absorber.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap or rod guide 50 which closes the upper end of pressure tube 30. A sealing system 52 seals the interface between rod guide 50, pressure tube 30 and piston rod 34. The end of piston rod 34 opposite to piston assembly 32 is adapted to be secure to the sprung portion of vehicle 10. The end of pressure tube 30 opposite to rod guide 50 is adapted to be connected to the unsprung portion of vehicle 10. Extension valving of piston assembly 32 controls the movement of fluid between upper working chamber 44 and lower working chamber 46 during an extension movement of piston assembly 32 within pressure tube 30. Compression valving of piston assembly 32 controls the movement of fluid between lower working chamber 46 and upper working chamber 44 during a compression movement of piston assembly 32 within pressure tube 30.

Referring to FIGS. 2-6, piston assembly 32 is illustrated in greater detail. Piston assembly 32 comprises a compression valve assembly 60, a multi-piece piston body 62 and an extension valve assembly 64. Piston rod 34 defines a reduced diameter section 66 onto which compression valve assembly 60, multi-piece piston body 62 and extension valve assembly 64 are located. A nut 68 secures piston assembly 32 onto section 66 of piston rod 34 with compression valve assembly 60 abutting a shoulder located on piston rod 34, multi-piece piston body 62 abutting compression valve assembly 60, extension valve assembly 64 abutting multi-piece piston body 62 and nut 68 abutting extension valve assembly 64 and multi-piece piston body 62.

Figure 3:
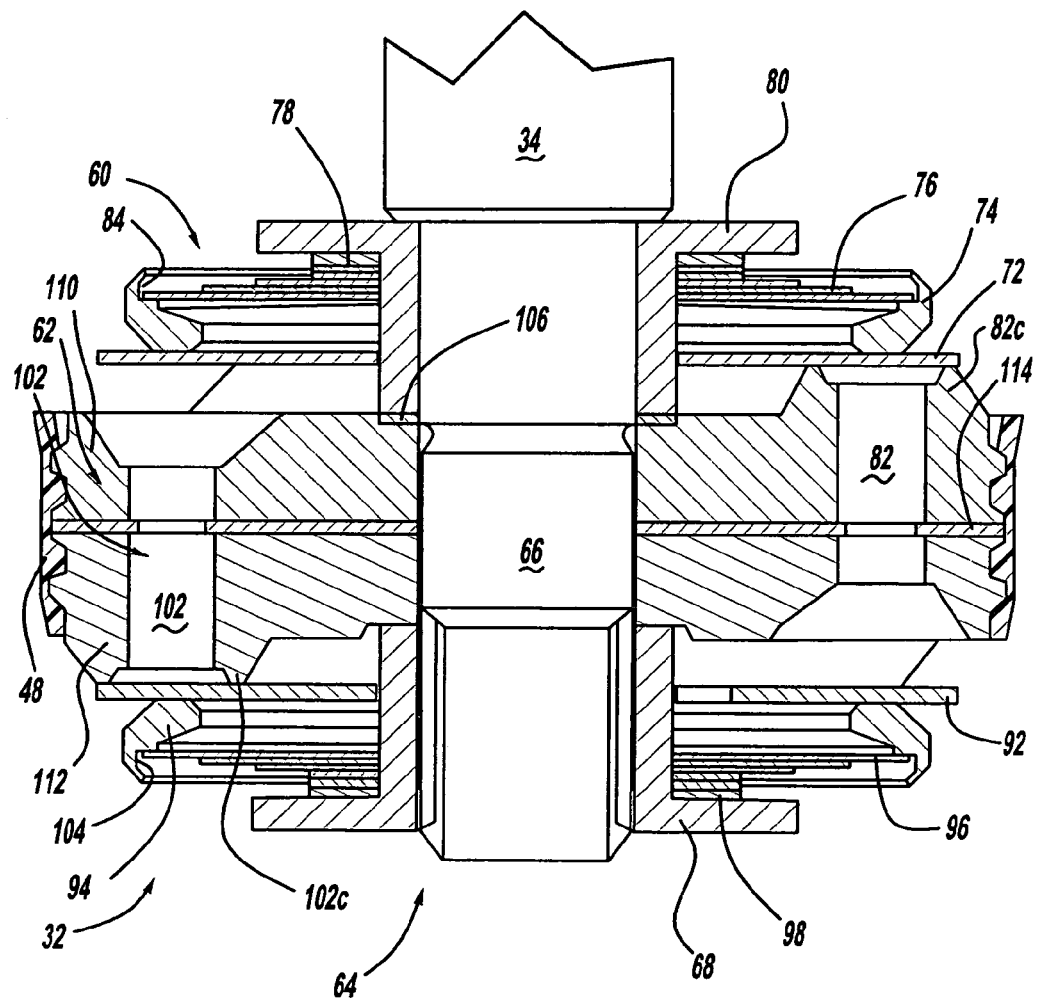
FIG. 3 is an enlarged side view, partially in cross-section, of the piston assembly from the shock absorber illustrated in FIG. 2.

Compression valve assembly 60 comprises a valve disc 72, an annular housing or interface 74, one or more biasing members 76, one or more spacers 78 and a retainer 80. Valve disc 72, biasing members 76 and spacers 78 are positioned and/or guided by engagement with retainer 80 as illustrated in FIG. 3. Valve disc 72 covers a plurality of compression passages 82 extending into multi-piece piston body 62. Annular housing 74 abuts the side of valve disc 72 opposite to multi-piece piston body 62. The one or more biasing members 76 engage annular housing 74 and urge annular housing 74 into engagement with valve disc 72 which urges valve disc 72 against multi-piece piston body 62. The biasing members 76 are nested within a recess 84 defined by annular housing 74 in order to center and maintain the position of annular housing 74 with respect to multi-piece piston body 62 and piston rod 34. The one or more spacers 78 are located between the one or more biasing members 76 and retainer 80. Retainer 80 abuts the shoulder formed by piston rod 34. Valve disc 72 prevents fluid flow from upper working chamber 44 to lower working chamber 46 but fluid flow from lower working chamber 46 to upper working chamber 44 is allowed due to the unseating of valve disc 72 due to the deflection of the one or more biasing members 76.

Extension valve assembly 64 comprises a valve disc 92, an annular housing or interface 94, one or more biasing members 96, one or more spacers 98 and nut 68. Valve disc 92, biasing members 96 and spacers 78 are positioned and/or guided by engagement with nut 68 as illustrated in FIG. 3. Valve disc 92 covers a plurality of extension passages 102 extending into multi-piece piston body 62. Annular housing 94 abuts the side of valve disc 92 opposite to multi-piece piston body 62. The one or more biasing members 96 engage annular housing 94 and urge annular housing 94 into engagement with valve disc 92 which urges valve disc 92 against multi-piece piston body 62. The biasing members 96 are nested within a recess 104 defined by annular housing 94 in order to center and maintain the position of annular housing 94 with respect to multi-piece piston body 62 and piston rod 34. The one or more spacers 98 are located between the one or more biasing members 96 and nut 68. The position of nut 68 is controlled by a plurality of shims 106 and this determines the biasing load applied by the one or more biasing members 76 and the one or more biasing members 96 and thus the damping characteristics for shock absorber 20 during a compression stroke and an extension stroke. Valve disc 92 prevents fluid flow from lower working chamber 46 to upper working chamber 44 but fluid flow from upper working chamber 44 to lower working chamber 46 is allowed due to the unseating of valve disc 92 due to the deflection of the one or more biasing members 96. While shims 106 are illustrated as being between retainer 80 and multi-piece piston body 62, it is within the scope of the present disclosure to have shims 106 disposed between multi-piece piston body 62 and nut 68.

Figure 4:
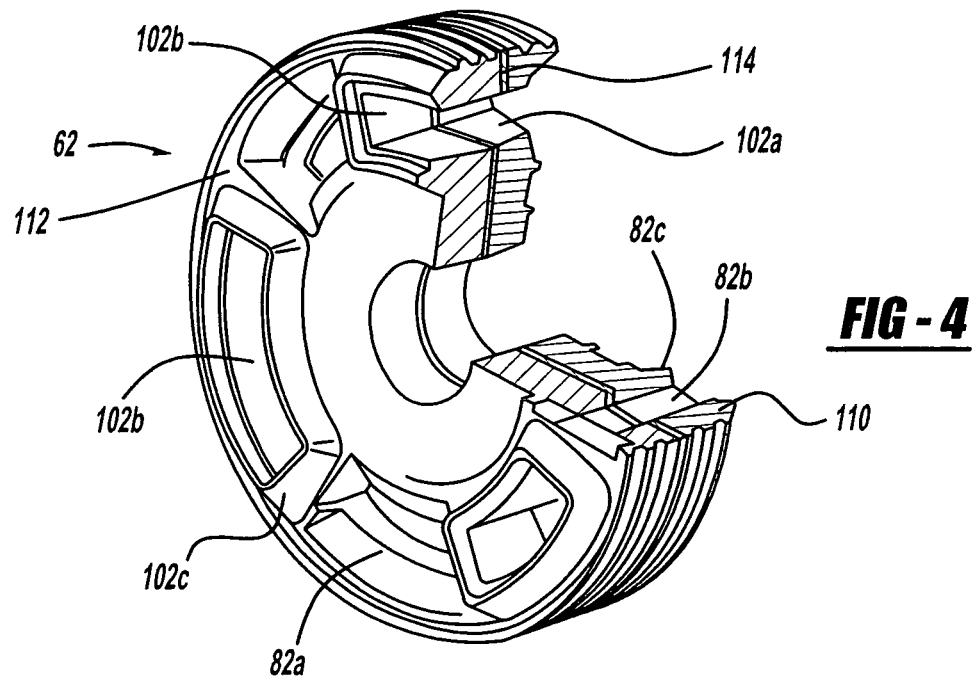
FIG. 4 is a cut-away perspective view of the piston illustrated in FIG. 3.
Figure 5:
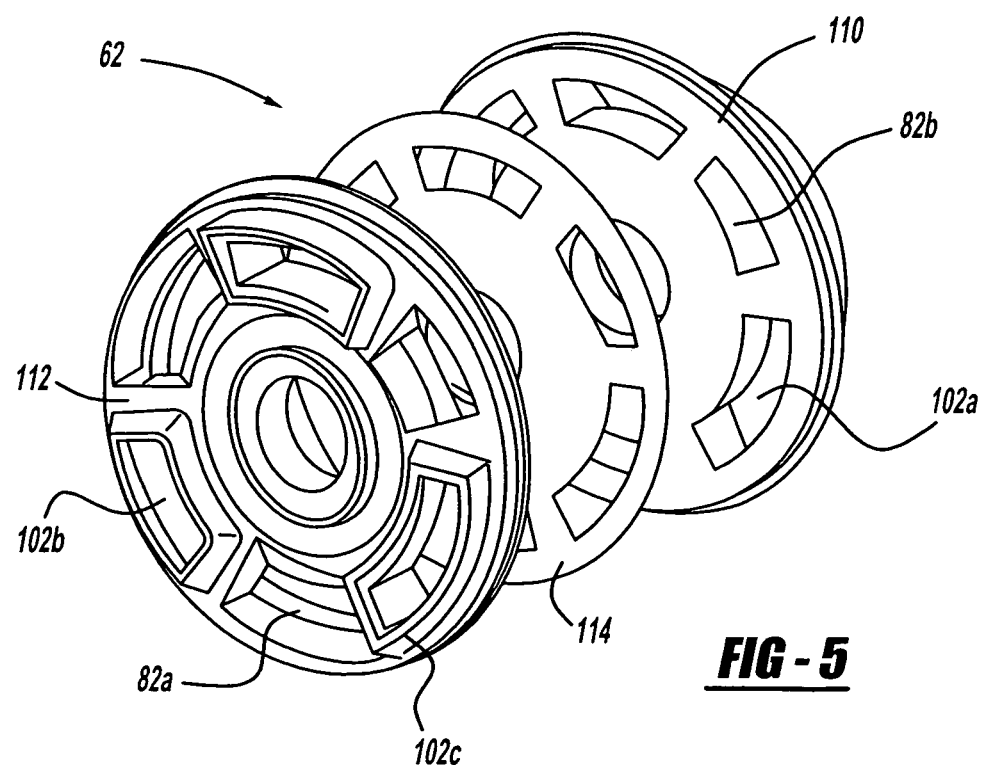
FIG. 5 is an exploded perspective view of the piston illustrated in FIG. 3.

Referring to FIGS. 3-6, multi-piece piston body 62 comprises a rebound side housing 110, a compression side housing 112 and a tuning disc 114. Rebound side housing 110 defines one or more extension passage inlets 102a and one or more compression passage outlets 82b. Each compression passage outlet 82b is surrounded by an island land 82c. While FIGS. 3-5 illustrate each compression passage outlet 82b as being surrounded by a single island land 82c, it is within the scope of the present invention to have one or more compression passage outlets 82b surrounded by a single island land 82c. Compression side housing 112 defines a plurality of compression passage inlets 82a and a plurality of extension passage outlets 102b. Each extension passage outlet 102b is surrounded by an island land 102c. While FIGS. 3-5 illustrate each extension passage outlet 102b being surrounded by a single island land 102c, it is within the scope of the present invention to have one or more extension passage outlets 102b surrounded by a single island land 102c. Tuning disc 114 is disposed between rebound side housing 110 and compression side housing 112 and the shape of tuning disc 114 also determines the damping characteristics for shock absorber 20.

Figure 6:
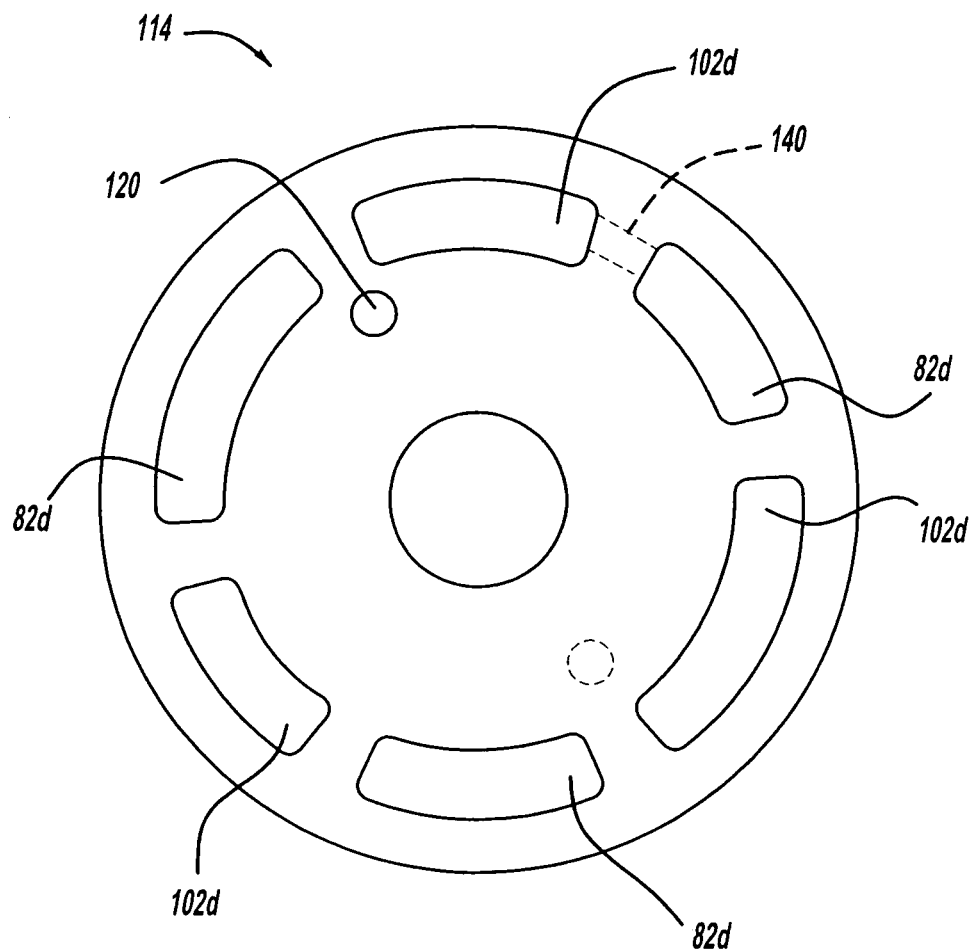
FIG. 6 is a plan view of the tuning disc illustrated in FIGS. 3-5.

Referring now to FIG. 6, tuning disc 114 defines a plurality of compression openings 82d and a plurality of extension openings 102d. When properly assembled, the plurality of compression openings 82d align with the plurality of compression passages 82 and the plurality of extension openings 102d align with the plurality of extension passages 102. In order to maintain the alignment of the above openings with their respective passages, various orientation means can be incorporated. A specific assembly tool (not shown) can be used to orient the parts directly followed by a banding process such as the assembly of seal 48. Seal 48 will act as retaining means and keep the components together in an assembled condition in the correct orientation during handling and assembly of piston assembly 32. One or more dents 120 can be formed into tuning disc 114. Dents 120 can be designed to engage one or more holes (now shown) in rebound side housing 110 and one or more holes (not shown) in compression side housing 112 to provide the correct orientation. A slight interference fit can be used between dents 120 and their respective hole to make it possible to further handle piston assembly 32. In addition, or as a replacement for the interference fit, seal 48 can be utilized to maintain the orientation of the components.

During a compression stroke of shock absorber 20, fluid pressure in lower working chamber 46 increases and fluid pressure in upper working chamber 44 decreases. This difference in fluid pressure reacts against valve disc 72 in a direction that attempts to unseat valve disc 72 from multi-piece piston body 62. This difference in fluid pressure also reacts against valve disc 92 to urge valve disc 92 into engagement with multi-piece piston body 62. When the fluid pressure differential increases, valve disc 72 will fully unseat from island lands 82c of multi-piece piston body 62 due to the deflection of the one or more biasing members 76 and fluid will flow from lower working chamber 46, through the plurality of compression passage inlets 82a, through the plurality of compression openings 82d, through the plurality of compression passage outlets 82b, past valve disc 72 and into upper working chamber 44.

The damping characteristics for shock absorber 20 during a compression stroke are determined by the one or more biasing members 76, and the size of compression openings 82d.

During an extension or rebound stroke of shock absorber 20, fluid pressure in upper working chamber 44 increases and fluid pressure in lower working chamber 46 decreases. This difference in fluid pressure reacts against valve disc 92 in a direction that attempts to unseat valve disc 92 from multi-piece piston body 62. This difference in fluid pressure also reacts against valve disc 72 to urge valve disc 72 into engagement with multi-piece piston body 62. When the fluid pressure differential increases, valve disc 92 will fully unseat from island lands 102c of multi-piece piston body 62 due to the deflection of the one or more biasing members 96 and fluid will flow from upper working chamber 44, through the plurality of extension passage inlets 102a, through the plurality of extension openings 102d, through the plurality of extension passage outlets 102b, past valve disc 92 and into lower working chamber 46.

The damping characteristics for shock absorber 20 during a rebound or extension stroke are determined by the one or more biasing members 96, and the size of extension openings 102d.

When tuning shock absorber 20, it may be advantageous to provide a common bleed flow passage 140 which is a passage that is always open in both compression and extension strokes of shock absorber 20. FIG. 6 illustrates, in phantom, bleed flow passage 140 which allows fluid flow between upper and lower working chambers 44 and 46 during both compression and rebound strokes of shock absorber 20. The amount of bleed flow can be controlled by controlling the size and number of bleed flow passages 140.

Thus, multi-piece piston body 62 permits the individual tuning of compression damping, rebound damping and bleed flow by varying the design of tuning disc 114. This permits different applications to utilize the same rebound side housing 110 and compression side housing 112 with the specific tuning requirements being selected by the design of tuning disc 114. In addition, additional tuning requirements can be selected by using different biasing members 76 and/or 96 but still with using common side housings 110 and 112.

Figure 7A:
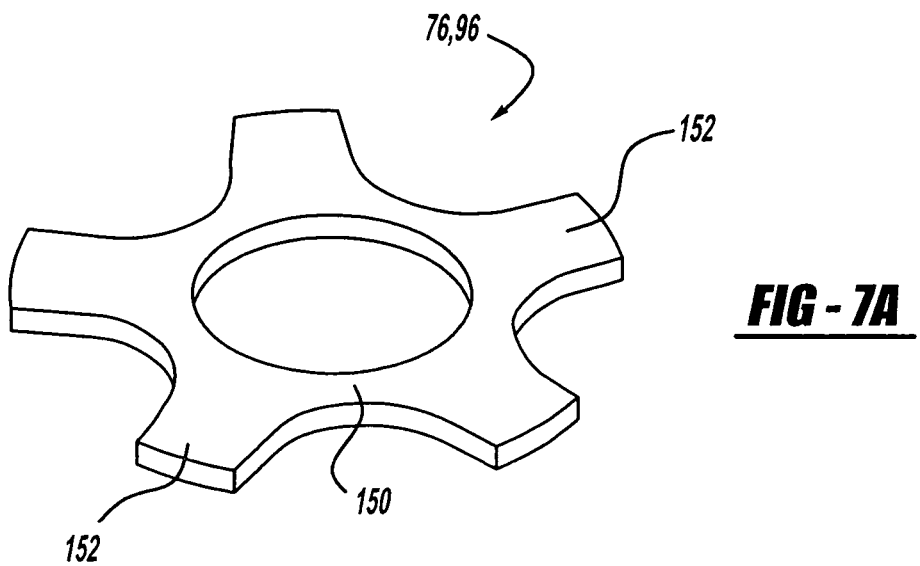
FIGS. 7A-7C are perspective views of various embodiments of the interface discs illustrated in FIGS. 2 and 3.
Figure 7B:
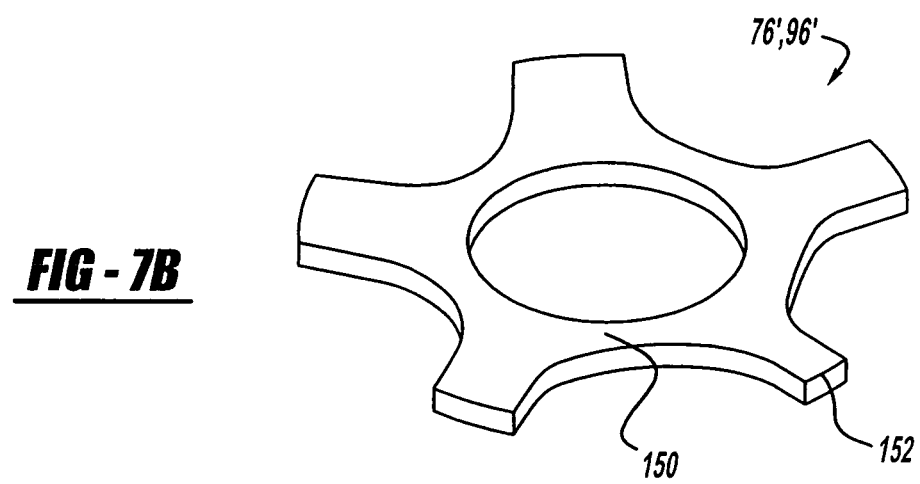
Figure 7C:
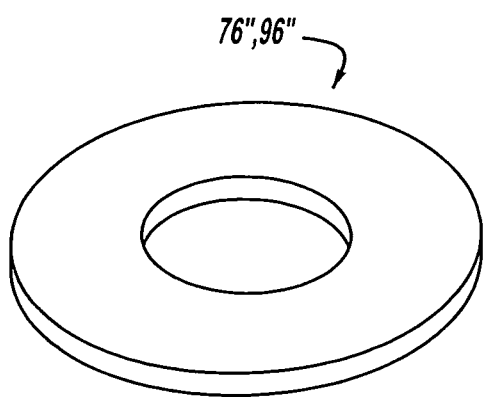

FIG. 7A illustrates one embodiment of biasing member 76 and biasing member 96. Biasing disc 76, 96 includes an annular center portion 150 and a plurality of legs 152. The number and width of legs 152 can be selected to provide the specified damping characteristics for shock absorber 20. As illustrated in FIG. 7A, the plurality of legs 152 are all the same width and are located symmetrically around center portion 150. FIG. 7B illustrates a biasing disc 76', 96' where the plurality of legs 152 are not the same width and are not symmetrically located around center portion 150, thus creating an asymmetric design. This asymmetric design can be used to tune the damping curve for shock absorber 20. FIG. 7C illustrates a biasing disc 76", 96" as an annular full disc without legs 152.

Figure 8:
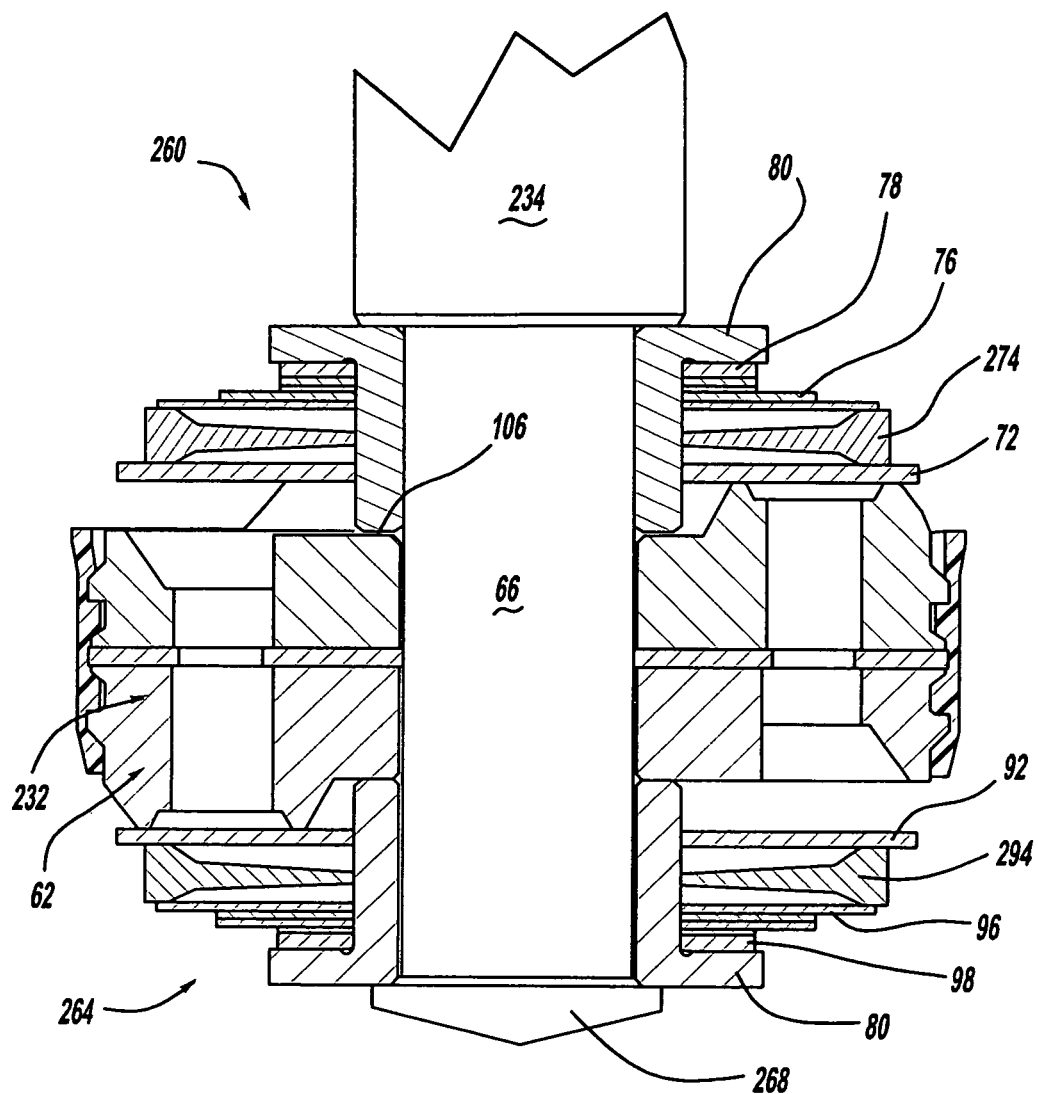
FIG. 8 is an enlarged side view, partially in cross section, of a piston assembly in accordance with another embodiment of the invention.

Referring now to FIG. 8, a piston assembly 232 is illustrated. Piston assembly 232 comprises a compression valve assembly 260, multi-piece piston body 62 and an extension valve assembly 264. A piston rod 234 defines reduced diameter section 66 onto which compression valve assembly 260, multi-piece piston body 62 and extension valve assembly 264 are located. Piston assembly 232 is secured onto section 66 of piston rod 234 using a riveted end 268 of piston rod 234. Compression valve assembly 260 abuts a shoulder located on piston rod 234, multi-piece piston body 62 abuts compression valve assembly 260, extension valve assembly 264 abuts multi-piece piston body 62 and riveted end 268 abuts extension valve assembly 264.

Compression valve assembly 260 comprises valve disc 72, an annular housing or interface 274, the one or more biasing members 76, the one or more spacers 78 and retainer 80. Thus, compression valve assembly 260 is the same as compression valve assembly 60 except that compression valve assembly 260 includes annular housing or interface 274. Interface 274 is guided for axial motion by being piloted on retainer 80. This allows for the elimination of recess 84 and allows biasing members 76 to simply abut annular housing 274. The function and operation for compression valve assembly 260 is the same as that discussed above for compression valve assembly 60.

Extension valve assembly 264 comprises valve disc 92, an annular housing or interface 294, the one or more biasing member 96, the one or more spacers 98 and a retainer 80. Thus, extension valve assembly 264 is the same as extension valve assembly 64 except that extension valve assembly 264 includes annular housing or interface 294 and retainer 80 replaces nut 68 because of riveted end 268 of piston rod 234. Interface 294 is guided for axial movement by being piloted on retainer 80. This allows for the elimination of recess 104 and allows biasing members 96 to simply abut annular housing 294. Riveted end 268 maintains the assembly of piston assembly 232 and it eliminates the threaded connection associated with piston rod 34 and nut 68. Piston assembly 232 also utilizes shims 106 to control the load exerted by biasing members 76 and 96.

Figure 9:
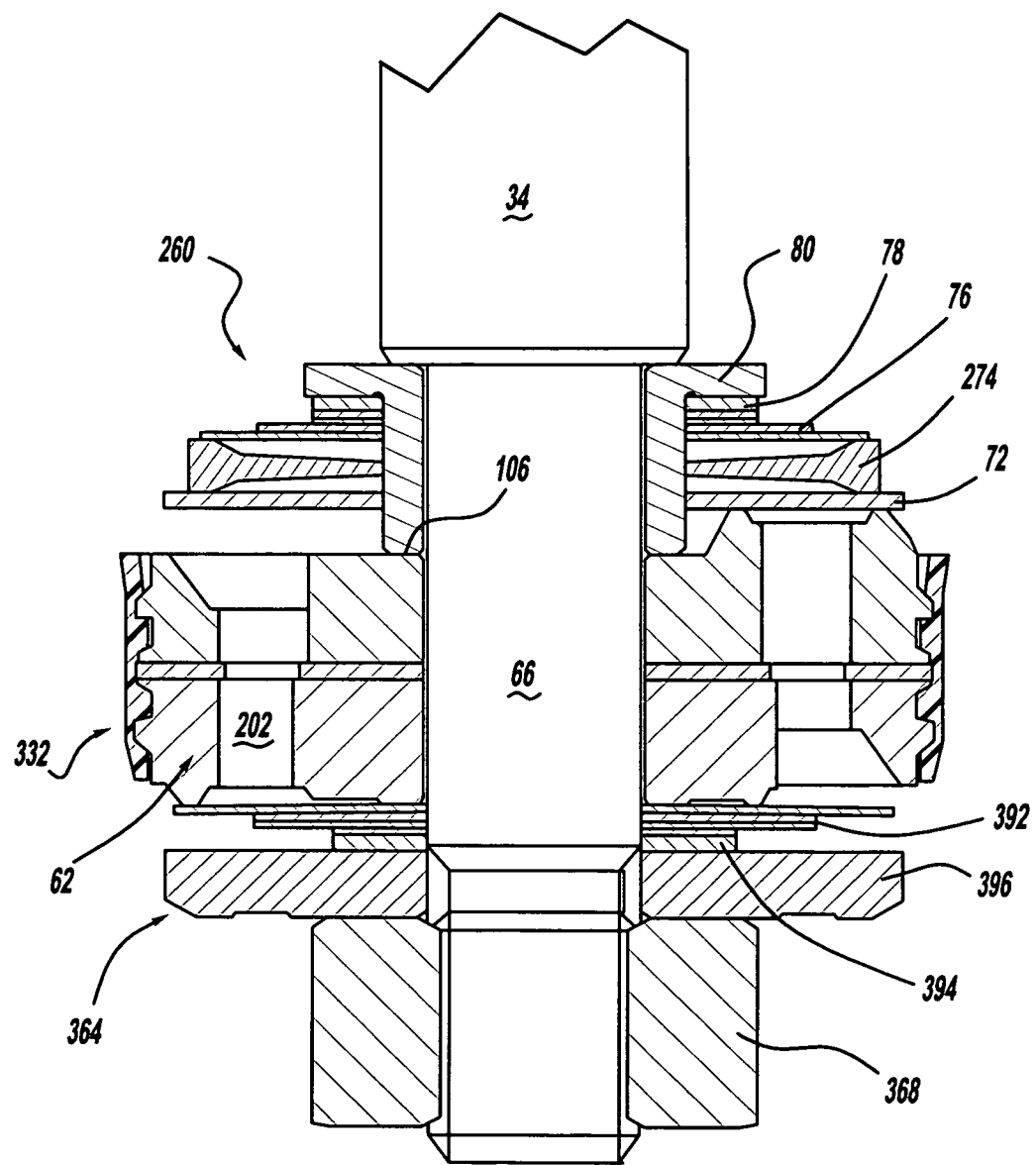
FIG. 9 is a perspective view of various embodiments of the interface discs illustrated in FIGS. 2 and 3.

Referring now to FIG. 9, a piston assembly 332 is illustrated. Piston assembly 332 comprises compression valve assembly 260, multi-piece piston body 62 and an extension valve assembly 364. Piston rod 34 defines reduced diameter section 66 onto which compression valve assembly 260, multi-piece piston body 62 and extension valve assembly 364 are located. Piston assembly 332 is secured onto section 66 of piston rod 34 using a nut 368. Compression valve assembly 260 abuts the shoulder on piston rod 34, multi-piece piston body 62 abuts compression valve assembly 260, extension valve assembly 364 abuts multi-piece piston body 62 and nut 368 abuts extension valve assembly 364.

Compression valve assembly 260 comprises valve disc 72, annular housing or interface 274, the one or more biasing members 76, the one or more spacers 78 and retainer 80. Thus, compression valve assembly 260 is the same as compression valve assembly 60 except that compression valve assembly 260 includes annular housing or interface 274. Interface 274 is guided for axial motion by being piloted on retainer 80. This allows for the elimination of recess 84 and allows biasing members 76 to simply abut annular housing 274. The function and operation for compression valve assembly 260 is the same as that discussed above for compression valve assembly 60.

Extension valve assembly 364 comprises a plurality of valve discs 392, one or more spacers 394 and a retainer 396. One valve disc 392 covers the plurality of extension passages 102 extending into multi-piece piston body 62. The one or more spacers 394 abut the side of valve discs 392 opposite to multi-piece piston body 62. The plurality of valve discs 392, the one or more spacers 394 and retainer 396 are clamped or sandwiched between multi-piece piston body 62 and nut 368. Shims 106 control the load being applied by biasing member 76 of compression valve assembly 260. The damping characteristics for shock absorber 20 during an extension stroke is controlled by the bending or deflection of valve discs 392. Valve discs 392 prevent fluid flow from lower working chamber 46 to upper working chamber 44 but fluid flow from upper working chamber 44 to lower working chamber 46 is allowed due to the bending or deflection of valve discs 92.

During an extension stroke of shock absorber 20, fluid pressure in upper working chamber 44 increases and fluid pressure in lower working chamber 46 decreases. This difference in fluid pressure reacts against valve discs 392 in a direction that attempts to bend or deflect valve discs 392. This difference in fluid pressure also reacts against valve disc 72 of compression valve assembly 260 to urge valve disc 72 into engagement with multi-piece piston body 62. When the fluid pressure differential increases, valve discs 92 will bend or deflect and fluid will flow from upper working chamber 44, through the plurality of extension passage inlets 102a, through the plurality of extension openings 102d, through the plurality of extension passage outlets 102b, past valve discs 392 and into lower working chamber 46.

What is claimed is:

1. A shock absorber comprising:
    a pressure tube forming a working chamber;
    a piston assembly disposed within said pressure tube dividing said working chamber into an upper working chamber and a lower working chamber, said piston assembly comprising:
        a first housing;
        a second housing attached to said first housing;
        a first plurality of passages extending between said upper and lower working chambers, said first plurality of passages extending through said first and second housings;
        a first valve assembly disposed in said upper working chamber adjacent a side of said first housing facing said upper working chamber, said first valve assembly including a first valve disc engaging said first housing to close at least one of said first plurality of passages and a first biasing member generating an asymmetrical load to bias said first valve disc against said first housing;
        a first plurality of lands extending from said side of said first housing, said first valve disc engaging said first plurality of lands, each of said first plurality of lands fully encircling a respective one of said first plurality of passages;
        a second plurality of passages extending between said upper and lower working chambers, said second plurality of passages extending through said first and second housings;
        a second valve assembly disposed in said lower working chamber adjacent a side of said second housing facing said lower working chamber, said second valve assembly including a second valve disc engaging said second housing to close at least one of said second plurality of passages; and
        a second plurality of lands extending from said side of said second housing, said second valve disc engaging said second plurality of lands, each of said second plurality of lands fully encircling a respective one of said second plurality of passages.

2. The shock absorber according to claim 1, wherein said first valve assembly further comprises a first interface disposed between said first valve disc and said biasing member.

3. The shock absorber according to claim 2, wherein said first interface engages said biasing member to center said first interface.

4. The shock absorber according to claim 2, further comprising a piston rod attached to said piston assembly, said first interface engaging said piston rod to center said first interface.

5. The shock absorber according to claim 1, wherein said first valve disc moves axially from a first position engaging said first housing to close said at least one of said first plurality of passages to a second position entirely spaced from said first housing, said at least one of said first plurality of passages being open when said first valve disc is in said second position.

6. The shock absorber according to claim 1, wherein said piston assembly further comprises a tuning disc disposed between said first and second housings, said tuning disc defining a plurality of tuning passages in communication with said first plurality of passages.

7. The shock absorber according to claim 6, wherein said tuning disc defines a bleed passage defining an always open flow path between said upper and lower working chambers.

8. The shock absorber according to claim 1, wherein said piston assembly further comprises a tuning disc disposed between said first and second housing, said tuning disc defining a first plurality of tuning passages in communication with said first plurality of passages and a second plurality of tuning passages in communication with said second plurality of passages.

9. The shock absorber according to claim 8, wherein said tuning disc defines an always open bleed passage extending between one of said first plurality of tuning passages and one of said second plurality of tuning passages.

10. The shock absorber according to claim 1, wherein said second valve assembly includes a second biasing member generating an asymmetrical load to bias said second valve disc against said second housing.

* * * * *